(12) United States Patent
Lu et al.

(10) Patent No.: US 11,461,038 B2
(45) Date of Patent: Oct. 4, 2022

(54) METHOD, DEVICE AND TERMINAL FOR TESTING MEMORY CHIP

(71) Applicant: Changxin Memory Technologies, Inc., Anhui (CN)

(72) Inventors: Tianchen Lu, Hefei (CN); Ruei-Yuan Guo, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 0 days.

(21) Appl. No.: 17/200,679

(22) Filed: Mar. 12, 2021

(65) Prior Publication Data

US 2021/0200460 A1 Jul. 1, 2021

Related U.S. Application Data

(63) Continuation of application No. PCT/CN2019/119527, filed on Nov. 19, 2019.

(30) Foreign Application Priority Data

Nov. 22, 2018 (CN) .......................... 201811396700.1

(51) Int. Cl.
*G06F 3/06* (2006.01)
*G06F 21/79* (2013.01)
(Continued)

(52) U.S. Cl.
CPC .......... *G06F 3/0653* (2013.01); *G06F 3/0622* (2013.01); *G06F 3/0679* (2013.01);
(Continued)

(58) Field of Classification Search
None
See application file for complete search history.

(56) References Cited

U.S. PATENT DOCUMENTS

| 5,748,879 A * | 5/1998 | Kobayashi | G11C 29/08 714/719 |
| 2002/0110027 A1 * | 8/2002 | Nakano | G11C 29/848 365/200 |

(Continued)

FOREIGN PATENT DOCUMENTS

| CN | 1402323 A | 3/2003 |
| CN | 102354537 A | 2/2012 |

(Continued)

OTHER PUBLICATIONS

PCT International Preliminary Report on Patentability dated Jun. 3, 2021, issued in related International Application No. PCT/CN2019/119527 (5 pages).

(Continued)

*Primary Examiner* — Charles J Choi
(74) *Attorney, Agent, or Firm* — Sheppard Mullin Richter & Hampton LLP

(57) ABSTRACT

The present disclosure provides a method, a device and a terminal for testing a memory chip. The method may include setting an attack mode and random attack parameters, generating a random attack command according to the attack mode and random attack parameters, attacking the memory chip according to the random attack command, and testing the attacked memory chip and generating a test result. This method is able to simulate various types of attacks and can thus perform a suitable test on the memory chip for the types of the actual attack. In addition, since the attacks can be randomized to any memory cell of the memory chip, testing of the whole memory chip is made possible.

20 Claims, 3 Drawing Sheets

(51) Int. Cl.
*G06F 11/22* (2006.01)
*G06F 11/263* (2006.01)

(52) U.S. Cl.
CPC ........ *G06F 11/2221* (2013.01); *G06F 11/263* (2013.01); *G06F 21/79* (2013.01)

(56) References Cited

U.S. PATENT DOCUMENTS

2012/0106227 A1* 5/2012 Song ..................... G11C 29/16
365/201
2014/0298120 A1 10/2014 Tong

FOREIGN PATENT DOCUMENTS

| CN | 107633867 A | 1/2018 |
| CN | 108154904 A | 6/2018 |

OTHER PUBLICATIONS

First Search dated Dec. 25, 2020, issued in related Chinese Application No. 201811396700.1 (2 pages).
First Office Action dated Jan. 5, 2021, issued in related Chinese Application No. 201811396700.1, with English machine translation (9 pages).
Supplementary Search dated Jul. 17, 2021, issued in related Chinese Application No. 201811396700.1 (2 pages).
Second Office Action dated Jul. 22, 2021, issued in related Chinese Application No. 201811396700.1, with English machine translation (9 pages).
PCT International Search Report and the Written Opinion dated Feb. 20, 2020, issued in related International Application No. PCT/CN2019/119527 (6 pages).

* cited by examiner

METHOD, DEVICE AND TERMINAL FOR TESTING MEMORY CHIP

CROSS-REFERENCE TO RELATED APPLICATIONS

This application is a continuation application of International Patent Application No. PCT/CN2019/119527, filed on Nov. 19, 2019, which is based on and claims priority to and benefits of the Chinese Patent Application No. 201811396700.1, filed with the State Intellectual Property Office (SIPO) of the People's Republic of China on Nov. 22, 2018. The entire content of the above-referenced application is incorporated herein by reference.

TECHNICAL FIELD

The present disclosure relates to the technical field of testing of memory chips and, more specifically, to a method, a device, and a terminal for testing a memory chip.

BACKGROUND

With more advanced fabrication technologies of memory chips, the physical sizes of semiconductor devices are getting smaller and smaller. Although it is possible to integrate more storage capacities on a single memory chip, the electromagnetic interference may occur among memory cells. As a result, a read/write operation performed on a certain memory area may interference adjacent memory areas, and undesired currents may flow into or out from the neighboring memory cells. When such a read/write operation is repeated for a large number of times, the information stored on the adjacent memory cells may change, for example, from "0" to "1" or from "1" to "0". This phenomenon is called bit flipping, and may be leveraged to commit attacks on the memory chip, i.e., which is commonly referred as bit-flipping attack or rowhammer attack.

Since bit-flipping attacks on a single line may involve hundreds of thousands of on and off operations, such attacks are generally associated with great randomness and high complexity. For this reason, it is difficult for existing test methods to simulate the attack process, and the testing may be difficult, inaccurate, and may take a long time. On the other hand, since the existing test methods may not be able to carry out a continuous wide-range test at one time, it is difficult to detect the status of the entire memory chip when it is attacked. Therefore, it is very difficult to verify the physical condition and specification of the memory chip.

It is to be noted that the above information disclosed in this Background section is only for enhancement of understanding of the background of the present disclosure and therefore may contain information that does not form the prior art that is already known to a person of ordinary skill in the art.

SUMMARY OF THE DISCLOSURE

The present disclosure provides a method, a device, and a terminal for testing a memory chip, which provide beneficial options for overcoming or mitigating one or more problems described in the Background section.

One aspect of the present disclosure is directed to a method for testing a memory chip. The method may comprise setting an attack mode and random attack parameters, generating a random attack command according to the attack mode and random attack parameters, attacking the memory chip according to the random attack command, and testing the attacked memory chip and generating a test result.

In one embodiment of the present disclosure, the method may comprise choosing a capacity of the memory chip, choosing at least an attack range according to the capacity, wherein the at least attack range may comprise at least one of a range of row addresses and a range of column addresses, and setting an attack count.

In one embodiment of the present disclosure, the method may comprise randomly choosing an odd number of test lines within the attack range to form at least a test line set, choosing at least an aggressor in each test line set, and attacking the at least aggressor in each test line set according to the random attack command.

In one embodiment of the present disclosure, the at least aggressor may comprise at least a middle line in each test line set, the test lines may comprise word lines, bit lines, or a combination thereof, and the at least test line set may comprise at least a word line set, or at least a bit line set, or a combination thereof.

In one embodiment of the present disclosure, the method may comprise checking data on the at least aggressor and data on victims thereof. If the data on the at least aggressor differ the data on the victims thereof, the attack on the memory chip is completed.

In one embodiment of the present disclosure, the victims of the at least aggressor comprise adjacent test lines of the at least aggressor, or test lines spaced apart from the at least aggressor by at least one test line.

In one embodiment of the present disclosure, the method may comprise recording the attack count into the test result when the attack on the memory chip is completed.

One aspect of the present disclosure may comprise a device for testing a memory chip, comprising an attack configuration module configured to set an attack mode and random attack parameters, an attack command generation module configured to generate a random attack command according to the attack mode and random attack parameters, a random attack module configured to attack the memory chip according to the random attack command, and an attack testing module configured to test the attacked memory chip and generate a test result.

In one embodiment of the present disclosure, the attack configuration module may comprise a chip capacity configuration unit configured to choose a capacity of the memory chip, and an attack range configuration unit configured to choose at least an attack range according to the capacity, wherein the at least attack range may comprise at least one of a range of row addresses and a range of column addresses, and an attack count configuration unit, configured to set an attack count.

In one embodiment of the present disclosure, the random attack module may comprise a word line grouping unit configured to randomly choose an odd number of word lines to form a word line set and choose at least a middle word line in each word line set, and a word line attack unit configured to attack the at least middle word line in each word line set according to the random attack command. The random attack module may also comprise a bit line grouping unit configured to randomly choose an odd number of bit lines to form a bit line set and choose at least a middle bit line in each bit line set, and a bit line attack unit configured to attack the at least middle bit line in each bit line set according to the random attack command.

In one embodiment of the present disclosure, the attack testing module may be configured to check data on at least an aggressor and data on victims thereof. If the data on the at least aggressor differ the data on the victims thereof, the attack on the memory chip is completed.

In one embodiment of the present disclosure, the victims of the at least aggressor may comprise adjacent word lines of the at least aggressor and word lines spaced apart from the at least aggressor by at least one word line, and the at least aggressor may comprise at least a middle word line in each word line set.

In one embodiment of the present disclosure, the victims of the at least aggressor may comprise adjacent bit lines of the at least aggressor and bit lines spaced apart from the at least aggressor by at least one bit line, and the at least aggressor may comprise at least a middle bit line in each bit line set.

In one embodiment of the present disclosure, the attack count configuration unit may be configured to recoding the attack count into the test result when the attack on the memory chip is completed One aspect of the present disclosure may be directed to a terminal for testing a memory chip that has experienced a random attack. The terminal may comprise the device as defined above, a processor, and a computer-readable storage unit comprising executable instructions, when executed, causing the processor to execute the method as described above.

The method, device, and terminal of the present disclosure offer the following advantages. Various types of attacks may be simulated and thus can perform a suitable test on the memory chip for the certain types of the actual attacks. Since the attacks can be randomized to any memory cell of the memory chip, testing of the whole memory chip is made possible.

The preceding summary is for illustration only and is not limiting in any sense. Besides the above illustrative aspects, embodiments, and features, other aspects, embodiments, and features will become apparent from the following detailed description in conjunction with the accompanying drawings.

BRIEF DESCRIPTION OF THE DRAWINGS

Throughout the following accompanying drawings, unless specified, like reference numerals indicate the same or analogous components or elements, and the accompanying drawings may not be drawn to scale. It is to be understood that these drawings depict only a portion of the embodiments of the present disclosure and should not be considered as limitation of the scope of the present disclosure.

DETAILED DESCRIPTION

Figure 1:
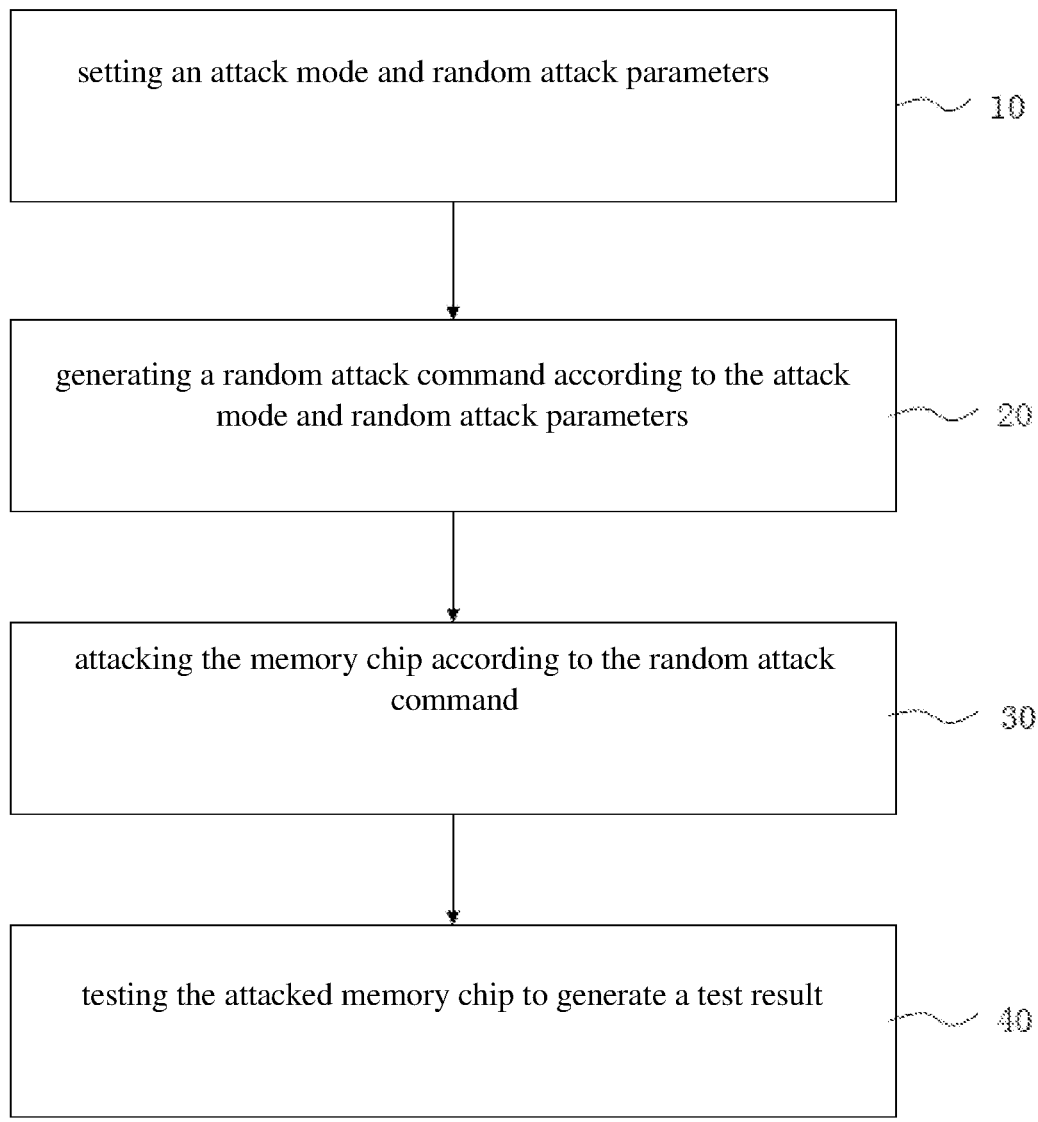
FIG. 1 shows a flowchart of a method for testing a memory chip according to an embodiment of the present disclosure.

Described below are merely certain exemplary embodiments. As will be recognized by those skilled in the art, the embodiments disclosed herein may be modified in various manners without departing from the spirit or scope of the present disclosure. Accordingly, the accompanying drawings and description are to be regarded as intrinsically exemplary rather than restrictive.

As used herein, the directional and spatial terms "central", "longitudinal", "lateral", "lengthwise", "widthwise", "thickness-wise", "upper", "lower", "front", "rear", "left", "right", "vertical", "horizontal", "top", "bottom", "interior", "exterior", "clockwise", "counterclockwise", "axial", "radial", "circumferential", etc. are meant to be used with respect to the configurations shown in the figures. They are intended merely to facilitate and simplify the explanation of the disclosure and do not indicate or imply the stated components or elements have to assume, or be constructed or operated in, particular orientations. Therefore, they are not to be construed as limiting the disclosure.

In addition, the terms "first", "second", etc. are used herein only for the purpose of illustration and are not to be construed as indicating or implying relative importance or implicitly indicating the number of the stated features. Therefore, a feature described with "first", "second" or the like can explicitly or implicitly indicate the presence of one or more such features. As used herein, the term "plurality" has the meaning of "two or more", unless the context clearly indicates otherwise.

As used herein, unless defined or limited otherwise, the terms "attached" "coupled", "connected", "fixed", "fastened" or any variant thereof, should be construed in a broad sense to encompass any connection established between two components, whether fixedly, detachably or integrally, whether mechanically, electrically or communicatively, whether directly or via an intermediate medium, whether through internal communication or through external interaction. For those of ordinary skill in the art, the aforementioned terms can be interpreted based on their context herein.

In this specification, unless defined or limited otherwise, when a first feature is described as being "on" or "under" a second feature, it can be in direct contact with the second feature, or intervening elements may also be present. Moreover, when a first feature is described as being "over", "overlying" or "above" a second feature, it may either be situated normally or obliquely over the second feature, or it may only be located at a horizontal level higher than a horizontal level at which the second feature is located. Similarly, when a first feature is described as being "under", "underlying" or "beneath" a second feature, it may either be situated normally or obliquely under the second feature, or it may only be located at a horizontal level lower than a horizontal level at which the second feature is located.

The following disclosure provides many different embodiments or examples for implementing different features of the present disclosure. Specific examples of components and arrangements are described below to simplify the present disclosure. These are, of course, merely examples and are not to be limiting. In addition, the present disclosure may repeat reference numerals and/or letters in the various examples. This repetition is for simplicity and clarity and does not dictate a relationship between the various embodiments and/or configurations discussed. Further, although the present disclosure provides examples of various particular processes and materials, those of ordinary skill in the art will recognize the use of other processes and/or the use of other materials.

Embodiment 1

In a specific embodiment of the present disclosure, as shown in FIG. 1, a method for testing a memory chip may include the following steps.

In Step S10, an attack mode and random attack parameters may be set.

In Step S20, a random attack command according to the attack mode and random attack parameters may be generated.

In Step S30, the memory chip may be attacked according to the random attack command.

In Step S40, the attacked memory chip may be tested and a test result may be generated.

As an example, the attack mode may include "Activate", "Write", "Read", etc. During a short time period, uninterrupted cycles of activation, writing, or reading can be performed on same word lines or bit lines. The attack mode may also be configured to attack which word lines and how many word lines at one time. In the case that only one of the word lines is attacked, the attacked word line (i.e., aggressor row) may leak electric charges to two adjacent word lines (i.e., victim rows), to cause bit-flipping of the two adjacent word lines. In the case that two of the word lines (i.e., two aggressor rows) are attacked, the word line (i.e., victim row) located between the two attacked word lines may be subject to a stronger leakage.

The random attack parameters may include an attack count, attack ranges, and so on. When the memory chip is under attacked with the random attack command generated according to the attack mode and random attack parameters, a random portion, such as word or bit line(s) of the memory chip, may be selected and attacked. When testing the attacked memory chip, in particular, detecting whether there are changes, such as transitions from "0" to "1" or from "1" to "0", in the information stored on the memory cells immediately adjacent to the attacked memory cells or on the memory cells spaced apart from the attacked memory cells by at least one word line or at least one bit line.

The method for testing a memory chip under random attacks (i.e., rowhammer attacks) disclosed in this embodiment may simulate various types of attack based on actual needs, and is suitable for testing the memory chip according to the different types of attack. Since the attacks can be randomized to any memory cell on the entire memory chip, testing of the whole memory chip is made possible.

In one embodiment of the present disclosure, setting the random attack parameters may include choosing a capacity of the memory chip, choosing an attack range based on the capacity, and setting an attack count. The attack range may include at least one of a row address range and a column address range.

In one example, the random attack parameters may be selected and set on a display interface. The chosen capacity of the memory chip may be, for example, 8G*8. The attack range may include a chipset ranges in 0x0-0x3, a chip ranges in 0x0-0x7, row addresses range in 0x0-0xffff, and column addresses range in 0x0-0x3ff. The chipset may be chosen first, the chips may be chosen from the selected chipset subsequently, and then the rows and columns may be configured respectively. The attack count may be set in a range of 0-1000. The aforementioned ranges are not limited to and may be adapted as needed, without departing from the scope of the present disclosure.

In one embodiment of the present disclosure, attacking the memory chip according to the random attack command may include randomly choosing an odd number of word lines within the row address range to form a word line set, choosing one or more middle word lines in the word line set, and attacking the middle word lines in each word line set according to the random attack command.

The memory chip may be initialized first, such as a same data may be written to each word line, the word lines within the row address range may be grouped into a plurality of word line sets, and each word line set may have an odd number of word lines, such as three or five word lines. Since the attacks may affect not only the immediately adjacent word lines but also those word lines spaced apart from the attacked word lines by at least one word line, attacking the middle word lines in the word line set may make it easier to choose the attacked positions and accurately identify the tested positions, i.e., those immediately adjacent to the attacked word lines or those spaced apart from the attacked word lines. In this case, the word lines to be tested can be identified swiftly, and thus the test speed may be increased. For example, for a word line set consisting of five word lines, the middle word lines, such as the second, the third, and the fifth word lines, may be chosen to be attacked (i.e., as the aggressor rows), and whether the data stored on the adjacent word lines or those spaced apart from the attacked word lines are changed may be detected.

In one embodiment of the present disclosure, testing the attacked memory chip and generating the test result may include checking the data on the row addresses of the attacked word lines (i.e., aggressor rows) and the data on the adjacent word lines (i.e., victim rows) thereof. If the data on the victim rows differ from the data on the aggressor rows, the attack on the memory chip is completed.

In one embodiment of the present disclosure, attacking the memory chip according to the random attack command may include randomly choosing an odd number of bit lines within the column address range to form a bit line set, choosing one or more middle bit lines in the bit line set, and attacking the middle bit lines in each bit line set according to the random attack command.

Figure 2:
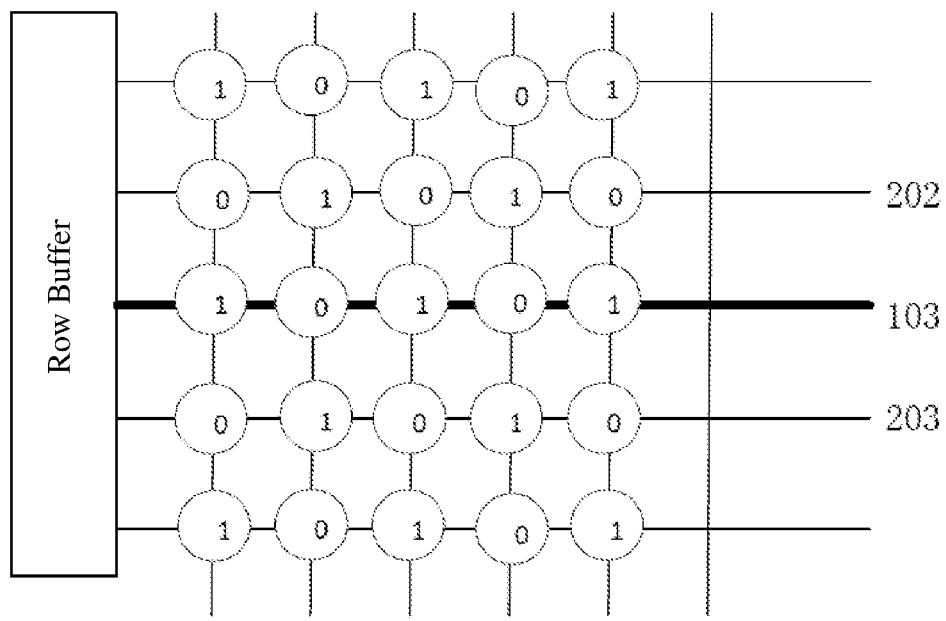
FIG. 2 schematically illustrates bit flipping of an attacked memory chip according to an embodiment of the present disclosure.

As shown in FIG. 2, in a chosen word line set, the attacks on the first word line 103 (i.e., the aggressor row) may affect the data stored on the memory cells coupled to the second adjacent word line 202 and the third adjacent word line 203 (i.e., the victim rows), which may flip from "0" to "1" or from "1" to "0". For example, data stored on the memory cells coupled to the victim rows may change from "10101" to "01010" due to the attacks.

Figure 3:
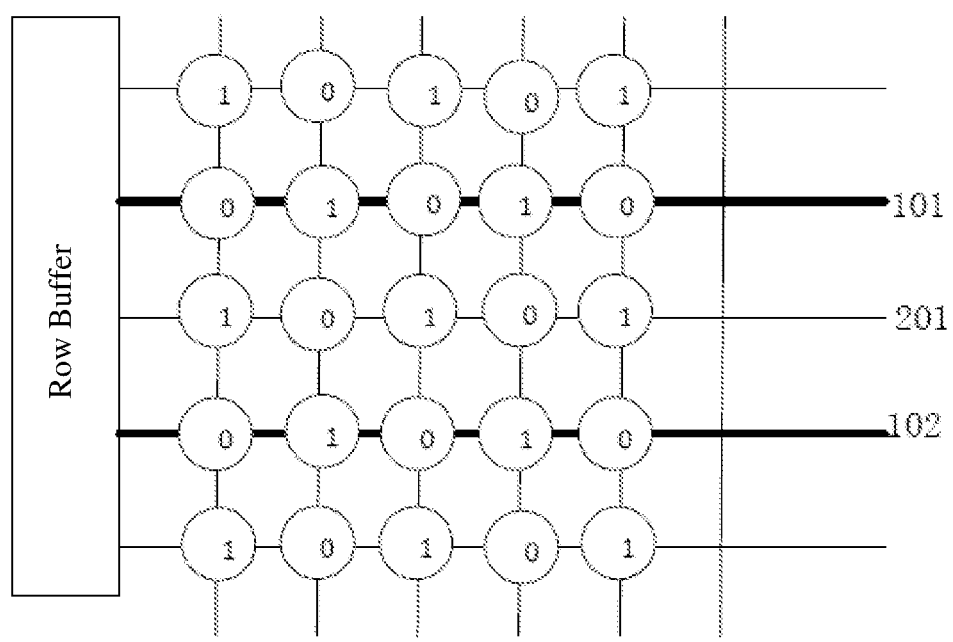
FIG. 3 schematically illustrates bit flipping of an attacked memory chip according to another embodiment of the present disclosure.

As shown in FIG. 3, in a chosen word line set, the attacks on the second word line 101 and the third word line 102 (i.e., the aggressor rows) may affect the data stored on the memory cells coupled to the first adjacent word line 201 (i.e., the victim row) adjacent to the both aggressor rows, such as flipping "0" to "1" or flipping "1" to "0". For example, the data stored on the memory cells coupled to the victim row may change from "01010" to "10101" due to the attacks.

In one embodiment of the present disclosure, testing the attacked memory chip and generating the test result may include checking the data on the row addresses of the attacked word lines (i.e., the aggressor rows) and the data on the word lines (i.e., the victim rows) spaced apart therefrom by at least one word line. If the data on the victim rows differ from the data on the aggressor rows, the attack on the memory chip is completed.

Figure 4:
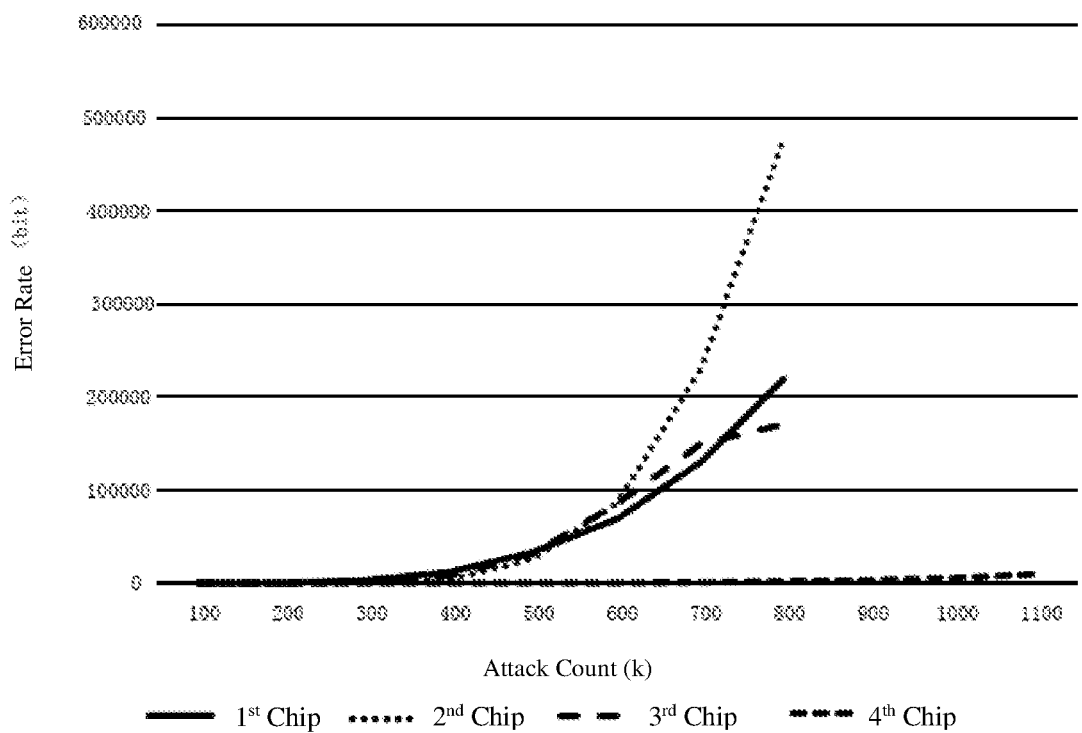
FIG. 4 is a diagram for testing a memory chip according to an embodiment of the present disclosure.

FIG. 4 shows comparisons of error rates of different chips (i.e., the first, second, third, and fourth chips as shown) under certain attack counts, for example, how many bits are failed (i.e., bits flipped) under a certain attack count. The attack counts may be recorded for indicating fail rates of the memory chip when the attack to the memory chip is completed each time to generate the test results. As shown, for each of the chips, the error rate increases with respect to increase of the attack count. Bit-flipping or rowhammer attacks may be prevented effectively by detecting the error rate.

Embodiment 2

Figure 5:
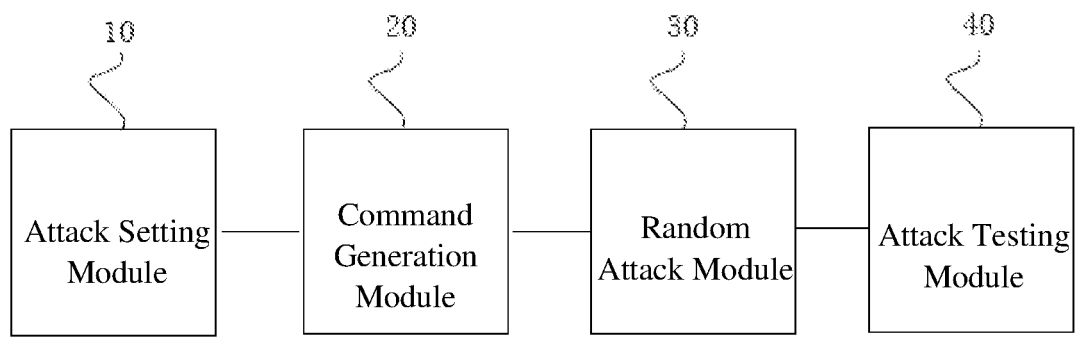
FIG. 5 is a block diagram of a device for testing a memory chip according to an embodiment of the present disclosure.

In another embodiment of the present disclosure, as shown in FIG. 5, a device for testing a memory chip may include an attack configuration module 10 configured to set an attack mode and random attack parameters, an attack command generation module 20 configured to generate a random attack command according to the attack mode and random attack parameters, a random attack module 30 configured to attack the memory chip according to the random attack command, and an attack testing module 40 configured to test the attacked memory chip and to generate a test result.

In one embodiment of the present disclosure, the attack configuration module 10 may include a chip capacity configuration unit configured to choose a capacity of the memory chip, an attack range configuration unit configured to choose an attack range according to the capacity, and an attack count configuration unit configured to set an attack count. The attack range may include at least one of a row address range and a column address range.

In one embodiment of the present disclosure, the random attack module 30 may include a word line grouping unit configured to randomly choose an odd number of word lines to form a word line set and choose at least a middle word line in each word line set, and a word line attack unit configured to attack the middle word line in each word line set according to the random attack command.

In one embodiment of the present disclosure, the attack testing module 40 may be configured to check the data on the row addresses of the attacked word lines (i.e., aggressor rows) and the data on the adjacent word lines thereof (i.e., victim rows). If the data on the victim rows differ from the data on the aggressor rows, the attack on the memory chip is completed.

In one embodiment of the present disclosure, the attack testing module 40 may be configured to check the data on the row addresses of the attacked word lines (i.e., aggressor rows) and the data on the word lines spaced apart therefrom (i.e., victim rows) by at least one word line. If the data on the victim rows differ from the data on the aggressor rows, the attack on the memory chip is completed.

In one embodiment of the present disclosure, the random attack module 30 may include a bit line grouping unit configured to randomly choose an odd number of bit lines to form a bit line set and choose at least a middle bit line in each bit line set, and a bit line attack unit configured to attack the middle bit line in each bit line set according to the random attack command.

Embodiment 3

In this embodiment of the present disclosure, a terminal for testing a memory chip may include the device of Embodiment 2, at least a processor, and a computer-readable storage unit storing executable instructions. When the executable instructions are executed, the processor may perform the method for testing a memory chip of Embodiment 1.

Described above are merely a few specific embodiments of the present disclosure. However, the scope of the present disclosure is not limited to these disclosed embodiments. Any changes and substitutions easily devisable by those of ordinary skill in the art in light of the teachings disclosed herein are all under the scope of the present disclosure. Accordingly, the scope of the present disclosure is defined by the appended claims.

The invention claimed is:

1. A method for testing a memory chip, comprising:
   setting an attack mode and random attack parameters;
   generating a random attack command according to the attack mode and random attack parameters;
   attacking the memory chip according to the random attack command by:
      randomly choosing an odd number of test lines within an attack range to form a test line set, and choosing an aggressor in the test line set, wherein the attack range comprises at least one of a range of row addresses and a range of column addresses, and
      attacking the aggressor in the test line set according to the random attack command; and
   testing the attacked memory chip and generating a test result.

2. The method of claim 1, wherein setting the random attack parameters comprises:
   choosing a capacity of the memory chip;
   choosing the attack range according to the capacity; and
   setting an attack count.

3. The method of claim 2, wherein setting the attack count includes recording the attack count into the test result when the attack on the memory chip is completed.

4. The method of claim 1, wherein
   the aggressor comprises a middle line in the test line set,
   the test lines comprise word lines, bit lines, or a combination thereof, and
   the test line set comprises a word line set, or a bit line set, or a combination thereof.

5. The method of claim 4, wherein testing the attacked memory chip and generating the test result comprises:
   checking data on the aggressor and data on victims thereof; and
   determining, in response to the data on the aggressor being different from the data on the victims thereof, that the attack on the memory chip is completed.

6. The method of claim 5, wherein the victims of the aggressor comprise adjacent test lines of the aggressor, or test lines spaced apart from the aggressor by at least one test line.

7. The method of claim 1, wherein the attack mode comprises Activate, Write, or Read.

8. A device for testing a memory chip, comprising:
   an attack configuration module, configured to set an attack mode and random attack parameters;
   an attack command generation module, configured to generate a random attack command according to the attack mode and random attack parameters;
   a random attack module, configured to attack the memory chip according to the random attack command, wherein the random attack module comprises:
      a word line grouping unit, configured to randomly choose an odd number of word lines to form a word line set and choose a middle word line in the word line set,
      a word line attack unit, configured to attack the middle word line in the word line set according to the random attack command,
      a bit line grouping unit, configured to randomly choose an odd number of bit lines to form a bit line set and choose a middle bit line in the bit line set, and a bit line attack unit, configured to attack the middle bit line in the bit line set according to the random attack command; and an attack testing module, configured to test the attacked memory chip and generate a test result.

9. The device of claim 8, wherein the attack configuration module comprises:

a chip capacity configuration unit, configured to choose a capacity of the memory chip;

an attack range configuration unit, configured to choose an attack range according to the capacity, the attack range comprising at least one of a range of row addresses and a range of column addresses; and an attack count configuration unit, configured to set an attack count.

10. The device of claim 9, wherein the attack testing module is configured to:

check data on an aggressor and data on victims thereof; and determine, in response to the data on the aggressor being different from the data on the victims thereof, that the attack on the memory chip is completed.

11. The device of claim 10, wherein the victims of the aggressor comprise adjacent word lines of the aggressor and word lines spaced apart from the aggressor by at least one word line, and the aggressor comprises the middle word line in the word line set.

12. The device of claim 10, wherein the victims of the aggressor comprise adjacent bit lines of the aggressor and bit lines spaced apart from the aggressor by at least one bit line, and the aggressor comprises the middle bit line in the bit line set.

13. The device of claim 9, wherein the attack count configuration unit is configured to record the attack count into the test result when the attack on the memory chip is completed.

14. A terminal for testing a memory chip under a random attack, comprising a device for testing a memory chip, wherein the terminal comprises:

a processor; and a computer-readable storage unit comprising executable instructions, when executed, causing the processor to perform operations including:

setting an attack mode and random attack parameters;

generating a random attack command according to the attack mode and random attack parameters;

attacking the memory chip according to the random attack command by:

randomly choosing an odd number of test lines within an attack range to form a test line set, and choosing an aggressor in the test line set, wherein the attack range comprises at least one of a range of row addresses and a range of column addresses, and attacking the aggressor in the test line set according to the random attack command; and testing the attacked memory chip and generating a test result.

15. The terminal of claim 14, wherein setting the random attack parameters comprises:

choosing a capacity of the memory chip;

choosing the attack range according to the capacity; and setting an attack count.

16. The terminal of claim 15, wherein setting the attack count includes recording the attack count into the test result when the attack on the memory chip is completed.

17. The terminal of claim 14, wherein the aggressor comprises a middle line in the test line set, the test lines comprise word lines, bit lines, or a combination thereof, and the test line set comprises a word line set, or a bit line set, or a combination thereof.

18. The terminal of claim 17, wherein testing the attacked memory chip and generating the test result comprises:

checking data on the aggressor and data on victims thereof; and determining, in response to the data on the aggressor being different from the data on the victims thereof, that the attack on the memory chip is completed.

19. The terminal of claim 18, wherein the victims of the aggressor comprise adjacent test lines of the aggressor, or test lines spaced apart from the aggressor by at least one test line.

20. The terminal of claim 14, wherein the attack mode comprises Activate, Write, or Read.

* * * * *